(12) United States Patent
Shimizu (10) Patent No.: US 8,730,089 B2
(45) Date of Patent: May 20, 2014

(54) VEHICLE RADAR SYSTEM

(75) Inventor: Yuji Shimizu, Kobe (JP)

(73) Assignee: Mitsubishi Electric Corporation, Tokyo (JP)

( * ) Notice: Subject to any disclaimer, the term of this patent is extended or adjusted under 35 U.S.C. 154(b) by 180 days.

(21) Appl. No.: 13/183,095

(22) Filed: Jul. 14, 2011

(65) Prior Publication Data
US 2012/0242529 A1 Sep. 27, 2012

(30) Foreign Application Priority Data

Mar. 25, 2011 (JP) .................................. 2011-067527

(51) Int. Cl.
*G01S 13/00* (2006.01)

(52) U.S. Cl.
USPC .............................. 342/70; 342/118; 342/139

(58) Field of Classification Search
USPC .................... 342/27, 70, 85, 107–109, 114
See application file for complete search history.

(56) References Cited

U.S. PATENT DOCUMENTS

| 6,204,755 B1* | 3/2001 | Kikuchi ........................ 340/435 |
| 2001/0026238 A1* | 10/2001 | Shirai et al. ..................... 342/70 |
| 2003/0142006 A1* | 7/2003 | Walton et al. ................... 342/70 |
| 2004/0145513 A1* | 7/2004 | Katayama et al. .............. 342/70 |
| 2011/0074620 A1* | 3/2011 | Wintermantel ................. 342/70 |
| 2011/0074621 A1* | 3/2011 | Wintermantel ................. 342/70 |

FOREIGN PATENT DOCUMENTS

JP 2006-098220 A 4/2006

* cited by examiner

*Primary Examiner* — John B Sotomayor
*Assistant Examiner* — Marcus Windrich
(74) *Attorney, Agent, or Firm* — Sughrue Mion, PLLC (57) ABSTRACT

There are provided an object distinguishing unit that distinguishes an object every predetermined calculation cycle; and a state determination unit that determines a relative state between the object distinguished by the object distinguishing unit and a vehicle and that performs switching control in which based on the result of the determination, there is performed switching from one of a first angle detection unit and a second angle detection unit to the other in the next calculation cycle, and the value of an incident angle is inputted to the object distinguishing unit.

8 Claims, 8 Drawing Sheets

(a) IN THE CASE OF OBSTACLE (b) IN THE CASE OF NON-OBSTACLE

VEHICLE RADAR SYSTEM

BACKGROUND OF THE INVENTION

1. Field of the Invention

The present invention relates to a radar system mounted in a vehicle and more particularly to a vehicle radar system utilized in an ACC (Active Cruise Control) system, a pre-crash system, or the like.

2. Description of the Related Art

To date, as an apparatus for preventing a crash between vehicles or between a vehicle and an object in front, a vehicle rear-end accident, and the like before they occur, or as an apparatus for reducing impact damage to occupants when these crashes occur, there have been proposed a great number of apparatuses in which the degree of the risk of a crash between a reference vehicle and an object in front is determined and in accordance with the degree of the risk, a predetermined control unit is operated so that the crash is prevented or crash damage is reduced. In general, in these conventional apparatuses, as a unit for detecting an object in front of a vehicle, a vehicle radar system such as a millimeter wave radar or a laser radar is utilized.

For example, a millimeter wave radar is capable of detecting the relative distance or the relative speed between a reference vehicle and an object in front. Accordingly, by comparing the speed of the reference vehicle with the relative speed between the reference vehicle and the object in front, the millimeter wave radar can determine whether the object in front is moving or stationary. In this case, the stationary object denotes an object, such as a stationary vehicle, a telephone or a road-sign pole, or a pedestrian, which could often be an obstacle to the travel of the reference vehicle. However, in the objects that are to be detected as being stationary, there is included an object, such as a manhole cover or an empty can placed on a road, which does not bring about any trouble to the travel of the reference vehicle even when the reference vehicle passes over or under it.

However, considering the detection performance of a millimeter wave radar, it is extremely difficult to distinguish object types; therefore, in some times, the foregoing crash damage reducing apparatus utilizing a millimeter wave radar erroneously operates at a timing unintended by the driver, in response to an object that cannot be an obstacle in fact.

As an apparatus that solves these problems, for example, there has been disclosed an object detection apparatus (e.g., refer to Patent Document 1) in which a laser beam is irradiated forward in such a way that the irradiation region of an upward irradiation wave to be irradiated upward and the irradiation region of a downward irradiation wave to be irradiated downward partly overlap with each other, and based on the respective reflection intensities of the upward irradiation wave and the downward irradiation wave, the type of the object on which the irradiation waves have reflected is determined.

PRIOR ART REFERENCE

Patent Document

[Patent Document 1] Japanese Patent Application Laid-Open No. 2006-98220

However, because requiring a mechanical structure for irradiating a laser beam in two directions, i.e., upward and downward, the conventional technology disclosed in Patent Document 1 brings about complexity of the structure and a cost hike. Moreover, even when being stationary and bringing about no trouble, an object in front can possess a high reflection level, depending on the material thereof or the installation condition thereof; thus, it may not accurately be determined whether or not the object is stationary and brings about no trouble.

SUMMARY OF THE INVENTION

The present invention has been implemented in order to solve the foregoing problems in conventional apparatuses; the objective thereof is to obtain a vehicle radar system that can accurately distinguish a stationary object from an obstacle that brings about a trouble to the travel of a reference vehicle so as to prevent a crash prevention apparatus or a crash damage reducing apparatus from erroneously operating.

A vehicle radar system according to the present invention is mounted in a vehicle, irradiates an electric wave toward a space in front of the vehicle, receives a reflected wave, which is originally the irradiated electric wave and has been reflected by an object in front of the vehicle, and detects the object, based on the received reflected wave. The vehicle radar system includes a distance/relative speed detection unit that detects the distance and the relative speed between the vehicle and the object, based on the reflected wave; a first angle detection unit that detects an incident angle of the reflected wave having a direction along which there extends a first plane parallel to a road surface on which the vehicle travels; a second angle detection unit that detects an incident angle of the reflected wave having a direction along which there extends a second plane perpendicular to the first plane; an object distinguishing unit that receives the values of the distance and the relative speed detected by the distance/relative speed detection unit and the value of the incident angle detected by one of the first angle detection unit and the second angle detection unit and that distinguishes the object every predetermined calculation cycle, by use of these received values; and a state determination unit that determines a relative state between the object distinguished by the object distinguishing unit and a vehicle and that performs switching control in which based on the result of the determination, there is performed switching from one of a first angle detection unit and a second angle detection unit to the other in the next calculation cycle, and the value of an incident angle is inputted to the object distinguishing unit.

A vehicle radar system according to the present invention is mounted in a vehicle, irradiates an electric wave toward a space in front of the vehicle, receives a reflected wave, which is originally the irradiated electric wave and has been reflected by an object in front of the vehicle, and detects the object, based on the received reflected wave. The vehicle radar system includes a distance/relative speed detection unit that detects the distance and the relative speed between the vehicle and the object, based on the reflected wave; a first angle detection unit that detects an incident angle of the reflected wave having a direction along which there extends a first plane parallel to a road surface on which the vehicle travels; a second angle detection unit that detects an incident angle of the reflected wave having a direction along which there extends a second plane perpendicular to the first plane; an object distinguishing unit that receives the values of the distance and the relative speed detected by the distance/relative speed detection unit and the value of the incident angle detected by one of the first angle detection unit and the second angle detection unit and that determines every predetermined calculation cycle whether or not the object is a stationary object, by use of these received values; and a state determination unit that performs switching control in which in accordance with the state of a relative position between the vehicle and a stationary object distinguished by the object distinguishing unit, there is performed switching from one of the first angle detection unit and the second angle detection unit to the other in the next calculation cycle, and the value of the incident angle is inputted to the object distinguishing unit. In the case where a stationary object that is distinguished by the object distinguishing unit exists on a traveling track of the vehicle and the distance between the vehicle and the stationary object is smaller than a distance threshold value, the state determination unit performs the switching control in such a way that switching from the first angle detection unit to the second angle detection unit there is implemented, and the value of the incident angle is inputted to the object distinguishing unit.

A vehicle radar system according to the present invention is mounted in a vehicle, irradiates an electric wave toward a space in front of the vehicle, receives a reflected wave, which is originally the irradiated electric wave and has been reflected by an object in front of the vehicle, and detects the object, based on the received reflected wave. The vehicle radar system includes a distance/relative speed detection unit that detects the distance and the relative speed between the vehicle and the object, based on the reflected wave; a first angle detection unit that detects an incident angle of the reflected wave having a direction along which there extends a first plane parallel to a road surface on which the vehicle travels; a second angle detection unit that detects an incident angle of the reflected wave having a direction along which there extends a second plane perpendicular to the first plane; an object distinguishing unit that receives the values of the distance and the relative speed detected by the distance/relative speed detection unit and the value of an incident angle of the reflected wave detected by one of the first angle detection unit and the second angle detection unit and that determines every predetermined calculation cycle whether or not the object is a stationary object, by use of these received values; and a state determination unit that performs switching control in which in accordance with the state of a relative position between the vehicle and a stationary object distinguished by the object distinguishing unit, there is performed switching from one of the first angle detection unit and the second angle detection unit to the other in the next calculation cycle, and the value of the incident angle is inputted to the object distinguishing unit. In the case where a stationary object that is distinguished by the object distinguishing unit exists on a traveling track of the vehicle, the state determination unit performs the switching control in such a way that the rate of the calculation cycle in which the value of the incident angle detected by the second angle detection unit is utilized becomes larger than the rate of the calculation cycle in which the value of the incident angle detected by the first angle detection unit is utilized, each time the distance between the vehicle and the stationary object becomes smaller than any one of a plurality of distance threshold values.

A vehicle radar system according to the present invention is mounted in a vehicle, irradiates an electric wave toward a space in front of the vehicle, receives a reflected wave, which is originally the irradiated electric wave and has been reflected by an object in front of the vehicle, and detects the object, based on the received reflected wave. The vehicle radar system includes a distance/relative speed detection unit that detects the distance and the relative speed between the vehicle and the object, based on the reflected wave; a first angle detection unit that detects an incident angle of the reflected wave having a direction along which there extends a first plane parallel to a road surface on which the vehicle travels; a second angle detection unit that detects an incident angle of the reflected wave having a direction along which there extends a second plane perpendicular to the first plane; an object distinguishing unit that receives the values of the distance and the relative speed detected by the distance/relative speed detection unit and the value of an incident angle of the reflected wave detected by one of the first angle detection unit and the second angle detection unit and that determines every predetermined calculation cycle whether or not the object is a stationary object, by use of these received values; an obstacle determination unit that determines whether or not a stationary object distinguished by the object distinguishing unit is an obstacle to the travel of the vehicle; and a state determination unit that performs switching control in which in accordance with the state of a relative position between the vehicle and a stationary object distinguished by the object distinguishing unit, there is performed switching from one of the first angle detection unit and the second angle detection unit to the other in the next calculation cycle, and the value of the incident angle is inputted to the object distinguishing unit. In the case where a stationary object that is distinguished by the object distinguishing unit exists on a traveling track of the vehicle, while the vehicle approaches the stationary object, the state determination unit performs the switching control in such a way that the switching between the first angle detection unit and the second angle detection unit is prohibited and the value of the incident angle detected only by the first angle detection unit is inputted to the object distinguishing unit, at a time point when the obstacle determination unit fixes determination, regardless of the result of the determination.

A vehicle radar system according to the present invention includes a distance/relative speed detection unit that detects the distance and the relative speed between a vehicle and an object, based on a reflected wave; a first angle detection unit that detects an incident angle of the reflected wave having a direction along which there extends a first plane parallel to a road surface on which the vehicle travels; a second angle detection unit that detects an incident angle of the reflected wave having a direction along which there extends a second plane perpendicular to the first plane; an object distinguishing unit that receives the values of the distance and the relative speed detected by the distance/relative speed detection unit and the value of the incident angle detected by one of the first angle detection unit and the second angle detection unit and that distinguishes the object every predetermined calculation cycle, by use of these received values; and a state determination unit that determines a relative state between the object distinguished by the object distinguishing unit and a vehicle and that performs switching control in which based on the result of the determination, there is performed switching from one of a first angle detection unit and a second angle detection unit to the other in the next calculation cycle, and the value of an incident angle is inputted to the object distinguishing unit. As a result, there can be selected an object detection method in which an electric wave having the horizontal-plane direction is received and an object in front is widely detected or an object detection method in which an electric wave having the vertical-plane direction is received and it is distinguished whether or not an identification-subject object is an obstacle, in accordance with the condition in front of a reference vehicle.

A vehicle radar system according to the present invention includes a distance/relative speed detection unit that detects the distance and the relative speed between a vehicle and an object, based on a reflected wave; a first angle detection unit that detects an incident angle of the reflected wave having a direction along which there extends a first plane parallel to a road surface on which the vehicle travels; a second angle detection unit that detects an incident angle of the reflected wave having a direction along which there extends a second plane perpendicular to the first plane; an object distinguishing unit that receives the values of the distance and the relative speed detected by the distance/relative speed detection unit and the value of the incident angle detected by one of the first angle detection unit and the second angle detection unit and that determines every predetermined calculation cycle whether or not the object is a stationary object, by use of these received values; and a state determination unit that performs switching control in which in accordance with the state of a relative position between the vehicle and a stationary object distinguished by the object distinguishing unit, there is performed switching from one of the first angle detection unit and the second angle detection unit to the other in the next calculation cycle, and the value of the incident angle is inputted to the object distinguishing unit. In the case where a stationary object that is distinguished by the object distinguishing unit exists on a traveling track of the vehicle and the distance between the vehicle and the stationary object is smaller than a distance threshold value, the state determination unit performs the switching control in such a way that switching from the first angle detection unit to the second angle detection unit there is implemented, and the value of the incident angle is inputted to the object distinguishing unit. As a result, there can instantaneously be performed switching from an object detection method in which an object in front of a vehicle is widely detected to an object detection method in which it is determined whether or not an identification-subject object is an obstacle; therefore, it can accurately be determined whether or not an approaching stationary object is an obstacle.

A vehicle radar system according to the present invention includes a distance/relative speed detection unit that detects the distance and the relative speed between a vehicle and an object, based on a reflected wave; a first angle detection unit that detects an incident angle of the reflected wave having a direction along which there extends a first plane parallel to a road surface on which the vehicle travels; a second angle detection unit that detects an incident angle of the reflected wave having a direction along which there extends a second plane perpendicular to the first plane; an object distinguishing unit that receives the values of the distance and the relative speed detected by the distance/relative speed detection unit and the value of an incident angle of the reflected wave detected by one of the first angle detection unit and the second angle detection unit and that determines every predetermined calculation cycle whether or not the object is a stationary object, by use of these received values; and a state determination unit that performs switching control in which in accordance with the state of a relative position between the vehicle and a stationary object distinguished by the object distinguishing unit, there is performed switching from one of the first angle detection unit and the second angle detection unit to the other in the next calculation cycle, and the value of the incident angle is inputted to the object distinguishing unit. In the case where a stationary object that is distinguished by the object distinguishing unit exists on a traveling track of the vehicle, the state determination unit performs the switching control in such a way that the rate of the calculation cycle in which the value of the incident angle detected by the second angle detection unit is utilized becomes larger than the rate of the calculation cycle in which the value of the incident angle detected by the first angle detection unit is utilized, each time the distance between the vehicle and the stationary object becomes smaller than any one of a plurality of distance threshold values. As a result, there is performed weighted switching from an object detection method in which an object in front of a vehicle is widely detected to an object detection method in which it is determined whether or not an identification-subject object is an obstacle; therefore, it is made possible that while detection of an object in front the vehicle is continued, it is accurately determined whether or not an approaching stationary object is an obstacle.

A vehicle radar system according to the present invention includes a distance/relative speed detection unit that detects the distance and the relative speed between the vehicle and the object, based on a reflected wave; a first angle detection unit that detects an incident angle of the reflected wave having a direction along which there extends a first plane parallel to a road surface on which the vehicle travels; a second angle detection unit that detects an incident angle of the reflected wave having a direction along which there extends a second plane perpendicular to the first plane; an object distinguishing unit that receives the values of the distance and the relative speed detected by the distance/relative speed detection unit and the value of an incident angle of the reflected wave detected by one of the first angle detection unit and the second angle detection unit and that determines every predetermined calculation cycle whether or not the object is a stationary object, by use of these received values; an obstacle determination unit that determines whether or not a stationary object distinguished by the object distinguishing unit is an obstacle to the travel of the vehicle; and a state determination unit that performs switching control in which in accordance with the state of a relative position between the vehicle and a stationary object distinguished by the object distinguishing unit, there is performed switching from one of the first angle detection unit and the second angle detection unit to the other in the next calculation cycle, and the value of the incident angle is inputted to the object distinguishing unit. In the case where a stationary object that is distinguished by the object distinguishing unit exists on a traveling track of the vehicle, while the vehicle approaches the stationary object, the state determination unit performs the switching control in such a way that the switching between the first angle detection unit and the second angle detection unit is prohibited and the value of the incident angle detected only by the first angle detection unit is inputted to the object distinguishing unit, at a time point when the obstacle determination unit fixes determination, regardless of the result of the determination. As a result, regardless of the result of determination on an obstacle, the object detection method in which an object in front is widely detected is implemented after the determination is fixed, so that the object in front of the vehicle is prevented from being detected in a delayed manner or from being not detected.

The foregoing and other object, features, aspects, and advantages of the present invention will become more apparent from the following detailed description of the present invention when taken in conjunction with the accompanying drawings.

DETAILED DESCRIPTION OF THE PREFERRED EMBODIMENTS

Next, a vehicle radar system according to Embodiment 1 of the present invention will be explained.

Embodiment 1

Figure 1:
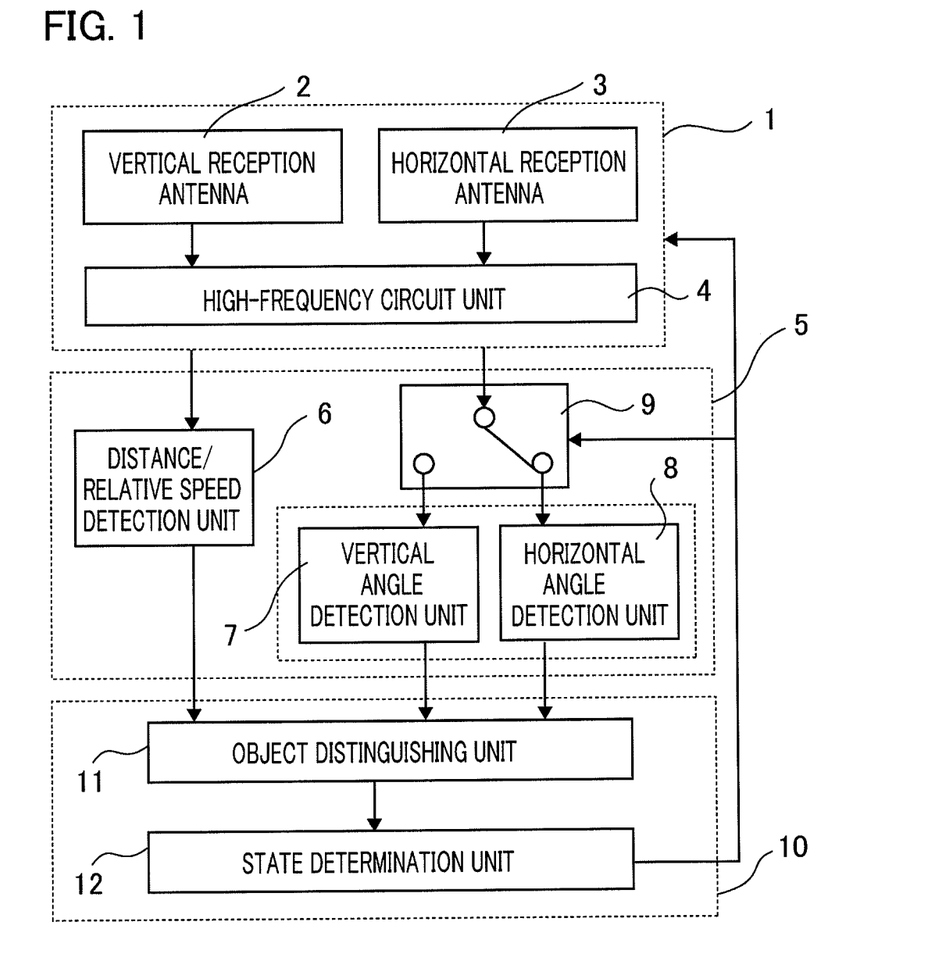
FIG. 1 is a block diagram illustrating the configuration of a vehicle radar system according to Embodiment 1 of the present invention.

FIG. 1 is a block diagram illustrating the configuration of a vehicle radar system according to Embodiment 1 of the present invention. In FIG. 1, the vehicle radar system is configured with a radar reception unit 1 for receiving a reflected electric wave, which is a millimeter-waveband electric wave that is transmitted through a transmission antenna (unillustrated) and comes back after being reflected by an object in front of a reference vehicle; a radar signal processing unit 5 for processing a radar signal from the radar reception unit 1; and a control-processing unit 10 for distinguishing objects in front of the reference vehicle, based on a signal from the radar signal processing unit 5, and determining, as described later, the relationship between the reference vehicle and an object.

The radar reception unit 1 is configured with a horizontal reception antenna 3 for receiving a reflected wave having a horizontal-plane direction as a first plane that is in parallel with a road surface; a vertical reception antenna 2 for receiving a reflected electric wave having a vertical-plane direction as a second plane that extends in a direction perpendicular to the horizontal-plane direction; and a high-frequency circuit unit 4 for processing a received electric wave. The radar reception unit 1 is preliminarily set in such a way that unless any instruction for switching, described later, is provided, a reflected electric wave is received through the horizontal reception antenna 3.

The radar signal processing unit 5 is configured with a distance/relative speed detection unit 6 for detecting the distance and the relative speed between the reference vehicle and an object in front, which is the transmitter of a reflected electric wave; a vertical angle detection unit 7 for detecting the incident angle of a reflected wave having the vertical-plane direction; a horizontal angle detection unit 8 for detecting the incident angle of a reflected wave having the horizontal-plane direction; and an angle detection switching unit 9 for inputting the output signal of the radar reception unit 1 to one of the vertical angle detection unit 7 and the horizontal angle detection unit 8.

The radar signal processing unit 5 is realized by utilizing a device, such as a DSP, a RAM, or a microcomputer (CPU), which is capable of performing fast Fourier transformation. The angle detection switching unit 9 is preliminarily set in such a way that unless any instruction for switching is provided, the output signal of the radar reception unit 1 is inputted to the horizontal angle detection unit 8 as a first angle detection unit. In addition, the foregoing distance, relative speed, and incident angle are calculated by use of the amplitude data or the phase data on a reflected wave. Because in the field of a millimeter wave radar, a great number of technologies have been disclosed through various media, detailed explanation for the method of calculating the foregoing distance, relative speed, and incident angle will be omitted. The data calculated by the radar signal processing unit 5 is inputted to the control-processing unit 10 situated after the radar signal processing unit 5.

The control-processing unit 10 is configured with an object distinguishing unit 11 and a state determination unit 12. In the object distinguishing unit 11, respective information pieces regarding the distance between the reference vehicle and an object, the relative speed, and the incident angle of a reflected electric wave are integrated and managed so as to become information on characteristics (parameters) of a single object in front. When at the same time, the respective information pieces are coordinate-transformed into the information pieces in an orthogonal coordinate system (forward and backward position—right and left position) by use of the distance data and the angle data, the state determination processing in the next stage can readily be performed.

Based on the relative-position relationship between the reference vehicle and an object in front, the state determination unit 12 constantly determines whether or not an identification-subject object exists. The identification-subject object denotes herein a stationary object detected on a road on which the reference vehicle travels. When detecting an identification-subject object, the state determination unit 12 outputs a switching instruction signal to the radar reception unit 1 and the angle detection switching unit 9, commanding them to perform switching to the vertical reception antenna 2 and the vertical angle detection unit 7 as a second angle detection unit, respectively.

The control-processing unit 10 can be realized through calculation processing by a microcomputer (CPU). The processing by the microcomputer is designed in such a way as to recurrently continue the operation at a predetermined calculation cycle. In general, a vehicle millimeter wave radar operates at a cycle of several tens through several hundreds of milliseconds. In this regard, however, because it takes a time for the radar signal processing unit 5 to output a processing result after an electric wave has been transmitted, the time to be allocated for control processing during a single calculation cycle is not long.

Figure 2:
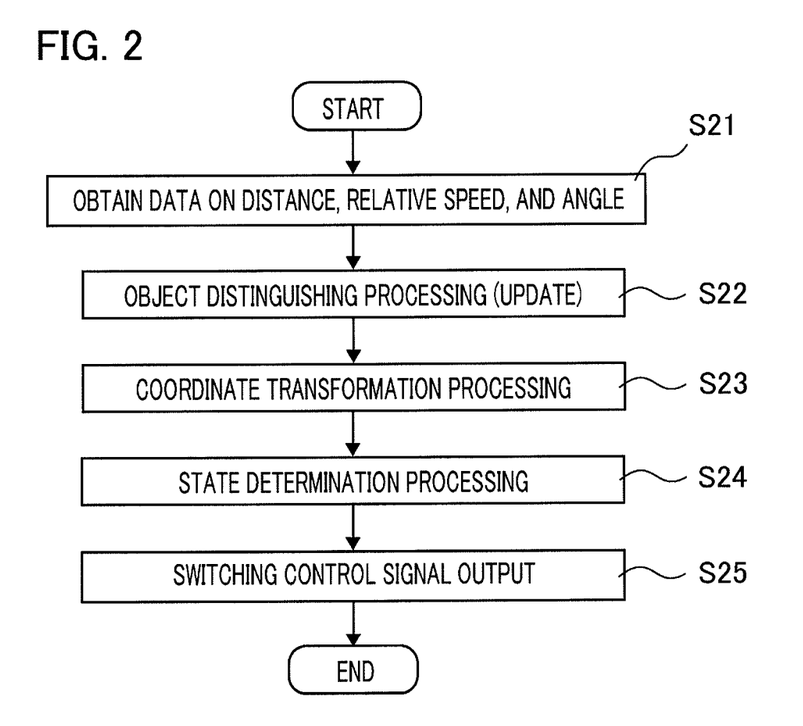
FIG. 2 is a flowchart for explaining the operation of a vehicle radar system according to Embodiment 1 of the present invention.

FIG. 2 is a flowchart for explaining the operation of a vehicle radar system according to Embodiment 1 of the present invention. In FIG. 2, in the step S21, there are obtained the distance, the relative speed, and the incident angle information outputted by the radar signal processing unit 5. As described above, a reflected electric wave is received through the horizontal reception antenna 3, and the horizontal angle detection unit 8 calculates a reflection angle in the horizontal-plane direction; however, this is a detection method for the purpose of uniformly and widely detecting objects in front, and hence the millimeter wave radar normally performs object detection along the horizontal-plane direction.

Next, after there are obtained, in the step 21, the distance, the relative speed, and the angle information from the radar signal processing unit 5, updating work for object distinguishing processing is performed in the step S22. Based on the viewpoint that the changing amounts, per calculation cycle, of the parameters for a single and the same object is small, the data of the last cycle and the data of the latest cycle are compared with each other and related to each other, so that the updating work is completed. In the step S23, there is performed coordinate transformation processing in which polar coordinates (distance—angle) are coordinate-transformed into orthogonal coordinates (forward and backward position—right and left position). In this embodiment, the transformation equation for the coordinate transformation processing will be omitted. The updating work for the object distinguishing processing in the step S22 may be performed after the coordinate transformation processing in the step S23 following the step S22.

Figure 3:
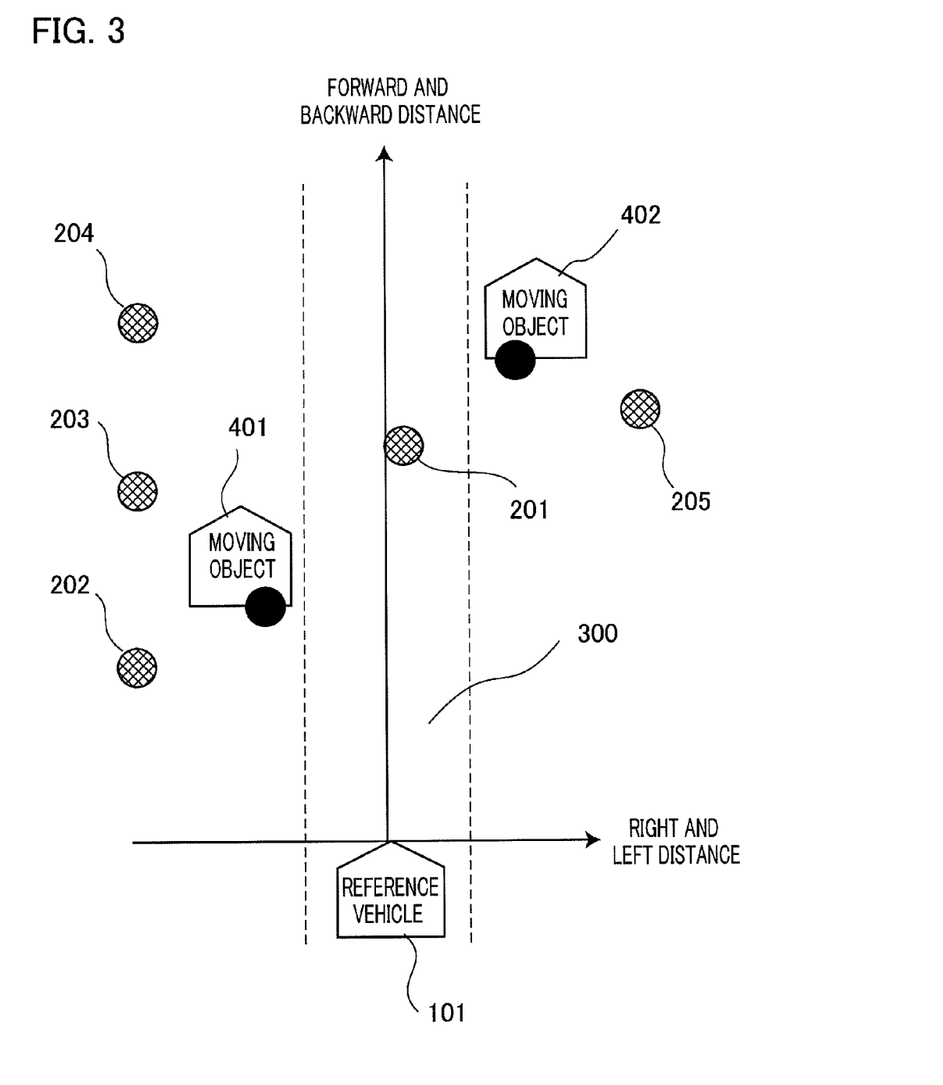
FIG. 3 is an explanatory chart for explaining the operation of a vehicle radar system according to Embodiment 1 of the present invention.

After that, in the step S24, state determination processing is performed. FIG. 3 is an explanatory chart for explaining the operation of a vehicle radar system according to Embodiment 1 of the present invention; FIG. 3 is an example of bird's-eye view representing the relative-position relationship between a reference vehicle and objects in front at a time after the coordinate transformation processing in the step S23. In FIG. 3, a reference vehicle 101 is traveling forward on a reference vehicle traveling track 300; in front of the reference vehicle 101, there exist a stationary object 201 inside the reference vehicle traveling track 300, stationary objects 202, 203, 204, and 205 outside the reference vehicle traveling track 300, and moving objects 401 and 402.

At the instant represented in FIG. 3, the stationary object 201 is detected at the front side of the reference vehicle traveling track 300; it is clear that the distance between the reference vehicle 101 and the stationary object 201 decreases as the reference vehicle 101 advances in this situation.

As described above, it is extremely difficult to distinguish the sizes and the weights of objects in front based on the detection performance of a current millimeter wave radar. That is because most of object recognition methods in millimeter wave radars are based on a technology in which an object in front is recognized in accordance with the intensity of an electric wave reflected by the object in front. Thus, regardless of whether or not the object is an obstacle to a reference vehicle, even though it is an empty can on a road, it is recognized as a stationary object in front when the intensity of the reflected electric wave is large.

Therefore, in the case where in the state determination processing in the step S24 of FIG. 2, the stationary object 201 is detected on the reference vehicle traveling track 300 through the object detection method in which an electric wave having the horizontal-plane direction is received through the horizontal reception antenna 3 and the horizontal angle detection unit 8 widely detects an object in front, switching instruction signals are outputted, in the step S25, to the radar reception unit 1 and the angle detection switching unit 9. As a result, from the next calculation cycle, a reflected electric wave is received through the vertical reception antenna 2 and the vertical angle detection unit 7 detects the reflection angle in the vertical-plane direction. This means switching from the method of widely detecting an object in front to the method of distinguishing whether or not a specific object is an obstacle.

Figure 4:
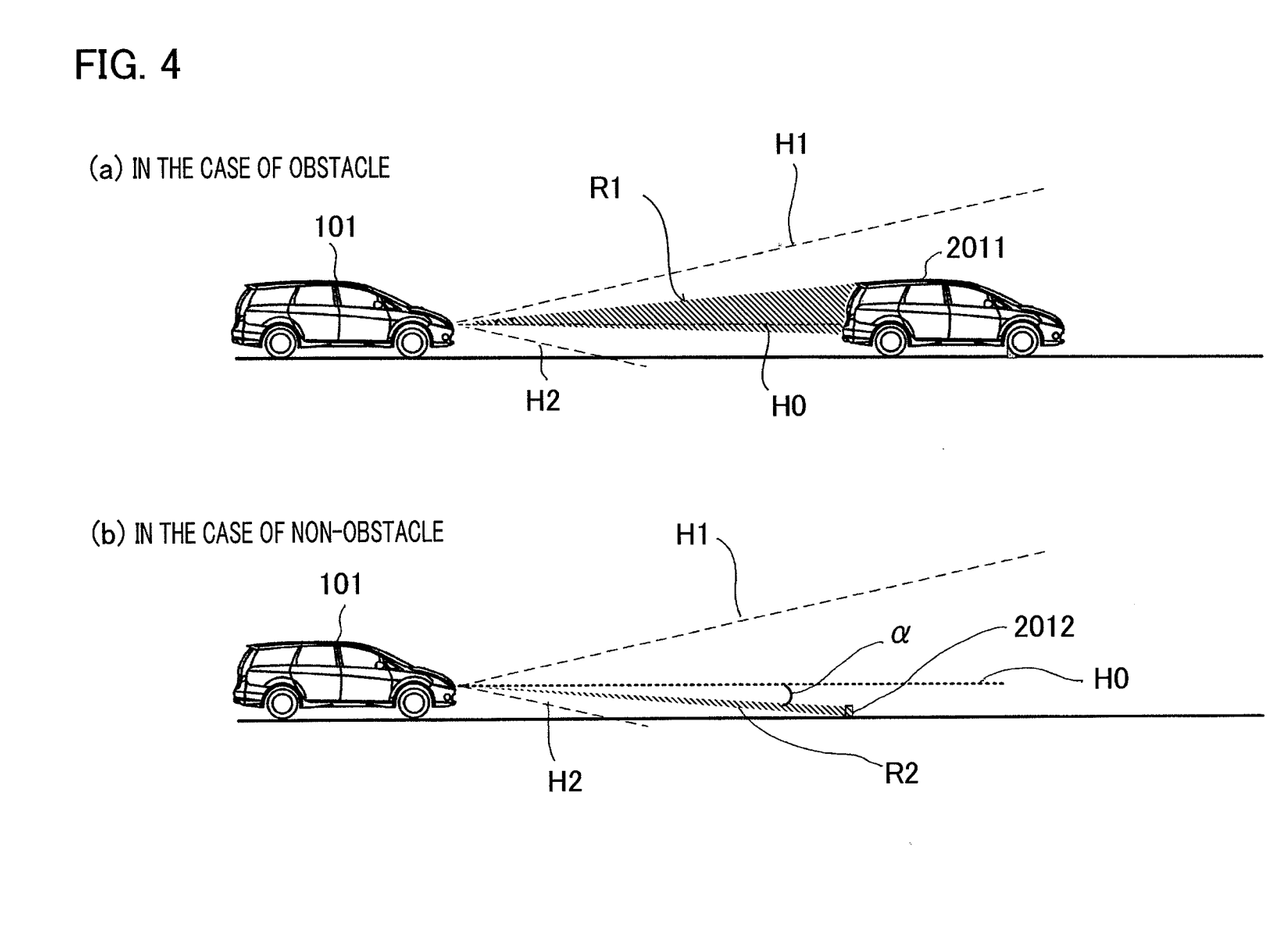
FIG. 4 is an explanatory chart for explaining the operation of a vehicle radar system according to Embodiment 1 of the present invention.

Here, there will be explained the outline of an obstacle determination method based on detection of an incident angle in vertical-plane direction. FIG. 4 is an explanatory chart for explaining the operation of a vehicle radar system according to Embodiment 1 of the present invention; FIG. 4(a) represents a case where a stationary vehicle 2011, which is an obstacle, exists ahead in the traveling direction of the reference vehicle 101; FIG. 4(b) represents a case where an empty can 2012, which is not an obstacle, exists ahead in the traveling direction of the reference vehicle 101. In FIG. 4, a vehicle radar system according to Embodiment 1 of the present invention is mounted in the reference vehicle 101 at a radar mounting height H0; the vehicle radar system irradiates a millimeter wave within a radar electric wave range from a vertical direction upper limit H1, indicated by a broken line, to a vertical direction lower limit H2, indicated by a broken line. In the case of FIG. 4(a), the reflection area of a radar electric wave from the stationary vehicle 2011 is R1; in the case of FIG. 4(b), the reflection area of a radar electric wave from the empty can 2011 is R2.

By detecting the incident angle in vertical-plane direction, the vehicle radar system according to Embodiment 1 of the present invention makes it possible to calculate the angle (elevation angle: "+", depression angle: "−") of an electric wave reflection point with respect to the radar mounting height H0. For example, in the case of FIG. 4(a), the reflection area R1 is the whole rear face of the stationary vehicle; a certain part of the reflection area R1 is detected as the reflection angle. In general, the space included in the reflection angle is situated in the vicinity of the radar mounting height H0. In contrast, in the case of FIG. 4(b), the reflection area R2 is as high as the empty can 2012; the reflection angle α is detected as a minus angle, i.e., a depression angle.

Furthermore, considering a case where in the situation illustrated in FIG. 4, the reference vehicle approaches an object in front, in the case of FIG. 4(a), the electric wave reflection point and the electric wave reception position (radar mounting height H0) do not change largely; therefore, when the reference vehicle 101 and the stationary vehicle 2011 approach each other, the amount of change in the reflection angle is small. However, in the case of FIG. 4(b), when the reference vehicle 101 and the empty can 2012 approach each other, the electric wave reflection point moves toward the lower limit H2 of the radar electric wave range and hence the reflection angle negatively increases. In consideration of the above facts, in the case where the reflection angle is in the minus region and negatively increases as the reference vehicle and the object in front approach each other, it can be determined that the object in front does not become an obstacle.

As described above, in the vehicle radar system according to Embodiment 1 of the present invention, an object detection method in which an electric wave having the horizontal-plane direction is received and an object in front is widely detected and an object detection method in which an electric wave having the vertical-plane direction is received and it is distinguished whether or not an identification-subject object is an obstacle are selectively switched in accordance with the condition in front of the reference vehicle; therefore, it can accurately be determined whether or not an approaching stationary object is an obstacle.

Embodiment 2

Figure 5:
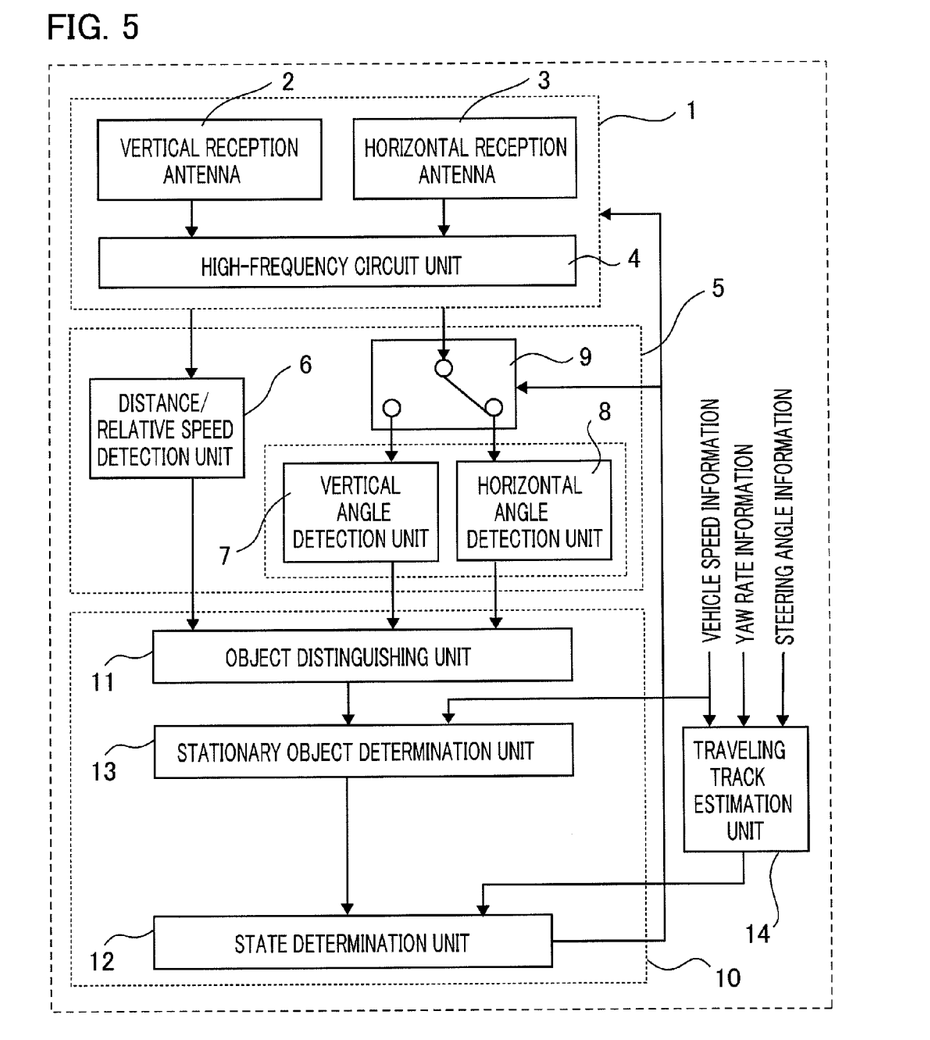
FIG. 5 is a block diagram illustrating the configuration of a vehicle radar system according to Embodiment 2 of the present invention.

Next, a vehicle radar system according to Embodiment 2 of the present invention will be explained. FIG. 5 is a block diagram illustrating the configuration of a vehicle radar system according to Embodiment 2 of the present invention. In FIG. 5, the reference numerals the same as those in FIG. 1 denote the same or equivalent elements; thus, explanation therefor will be omitted. In FIG. 5, when in the step S22 of FIG. 2, the object distinguishing unit 11 performs updating for the object distinguishing processing, a stationary object determination unit 13 compares speed information on the reference vehicle with respective relative speed information pieces on detected objects; when the speed information on the reference vehicle and the relative speed information on the detected object are identical to each other, the stationary object determination unit 13 determines that the detected object is a stationary object.

Based on vehicle speed information and yaw rate sensor information (or steering angle sensor information), a traveling track estimation unit 14 estimates not only a straight track but also a curved track. The predicted track calculation method utilizing vehicle speed information and yaw rate information is generally known; therefore, explanation therefor will be omitted. Through the estimation of the traveling track by the traveling track estimation unit 14, the existence of a stationary object on the reference vehicle traveling track can be recognized. Additionally, vehicle-characteristic information pieces such as vehicle speed information and yaw rate information can be obtained from an external control apparatus (unillustrated) by way of a CAN communication unit or a serial communication unit.

Figure 6:
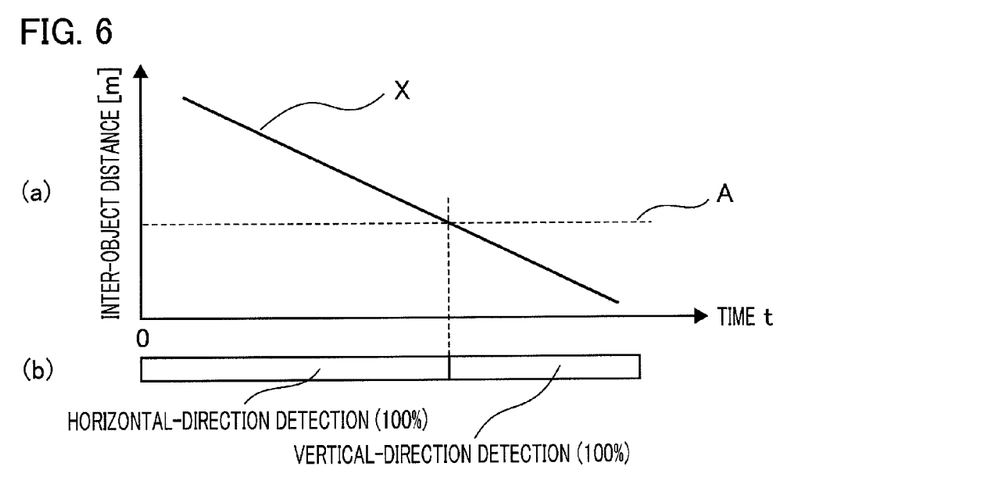
FIG. 6 is a graph representing the relationship between a distance threshold value and the state where a vehicle is approaching a stationary object, in a vehicle radar system according to Embodiment 2 of the present invention.

FIG. 6(*a*) is a graph representing, with the abscissa of the elapsed time and the ordinate of the inter-object distance, a situation, for example, illustrated in FIG. 4(*b*), where the reference vehicle 101 approaches the empty can 2012, which is a stationary object. The solid line X indicates the distance locus when the reference vehicle approaches a stationary object and represents the fact that the inter-object distance decreases (i.e., the reference vehicle is approaching the stationary object) as the time elapses. FIG. 6(*b*) represents selection between the horizontal-direction detection method and the vertical-direction detection method; by use of the proportion of calculation cycle units, there is represented, corresponding to the distance locus X, which one of the vertical angle detection unit 7 and the horizontal angle detection unit 8 is utilized. In other words, for example, in the case where any one of vertical angle detection unit 7 and the horizontal angle detection unit 8 is constantly connected, the proportion of the corresponding detection method is 100%; in the case where in 10 calculation cycles, switching to the horizontal angle detection unit 8 and the switching to the vertical angle detection unit 7 are performed 8 times and twice, respectively, the proportions of the horizontal-direction detection and the vertical-direction detection are 80% and 20%, respectively.

A predetermined distance threshold value A is a fixed value of, for example, 30 [m]; FIG. 6 represents a switching control method in which when the inter-object distance is the same as or larger than 30 [m], the horizontal angle detection unit 8 is constantly (100%) connected, and when the inter-object distance is smaller than 30 [m], which is the predetermined distance threshold value, the vertical angle detection unit 7 is constantly (100%) connected. Accordingly, it is made possible that at a time point when the distance between the reference vehicle and a stationary object in front becomes smaller than the predetermined distance threshold value A, there is instantaneously performed switching from the horizontal-direction detection, which is an object detection method of widely detecting an object in front, to the vertical-direction detection, which is an object detection method of distinguishing whether or not an identification subject is an obstacle. As a result, it can accurately be determined whether or not an approaching stationary object is an obstacle.

Figure 7:
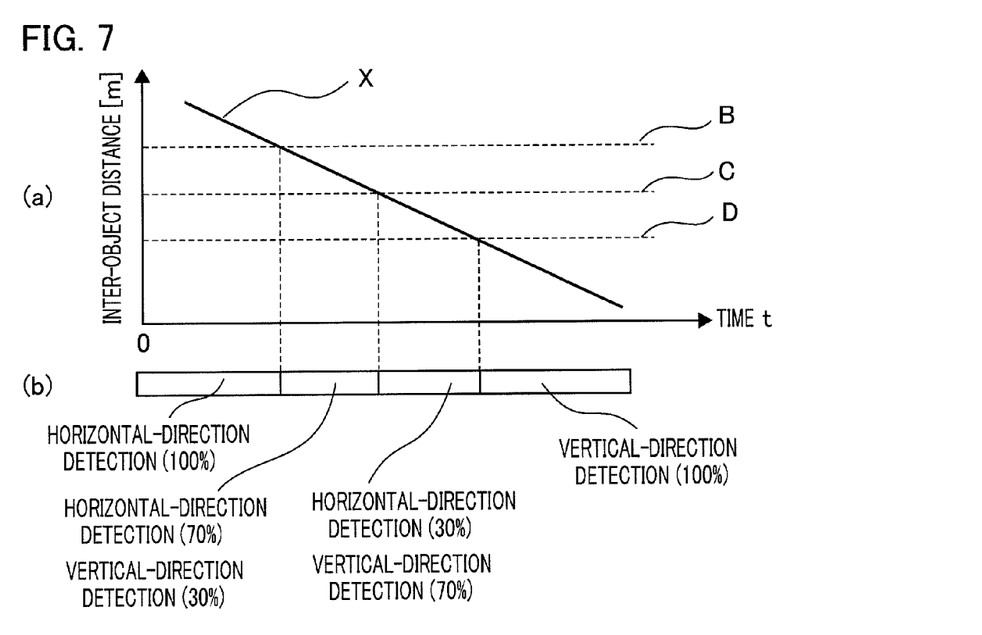
FIG. 7 is a graph representing the relationship between a distance threshold value and the state where a vehicle is approaching a stationary object, in a vehicle radar system according to Embodiment 2 of the present invention.

A plurality of distance threshold values A may be set. FIG. 7 is a graph representing the relationship between a distance threshold value and the state where a vehicle is approaching a stationary object, in a vehicle radar system according to Embodiment 2 of the present invention; there is represented a case where three distance threshold values B, C, and D are set. For example, the three distance threshold values B, C, and D are preliminarily set to 60 [m], 40 [m], and 20 [m], respectively; each time the inter-object distance becomes smaller than the distance threshold value B, C, or D, there is changed the rate of switching from the horizontal angle detection unit 8 to the vertical angle detection unit 7 in synchronization with the processing cycle, i.e., there is performed weighting.

The reason why as the inter-object distance decreases, the rate of switching to the vertical angle detection unit 7 is raised is as follows: That is to say, as represented in FIG. 4(*b*), in the case where the empty can 2012 exists far from the reference vehicle, the reflection area R2 is extremely narrow; thus, it is difficult to detect the empty can 2012. In addition, even when the reference vehicle is approaching the empty can 2012, the amount of change in the vertical-plane direction angle is minute; therefore, it is difficult to accurately determine whether or not the empty can 2012 falls under the category of an obstacle. Furthermore, in the case where there exists a space in front of the reference vehicle 101, another vehicle is very likely to cut in the reference vehicle's lane; therefore, it is required that in addition to the vertical-direction detection, the horizontal-direction detection is performed so that the situation of detecting an object in front of the reference vehicle is updated. On the other hand, in the case where there exists a fallen object on the road such as the empty can 2012, it becomes easier to detect the fallen object on the road as the reference vehicle 101 approaches the fallen object, and the amount of change in the reflection angle of the electric wave becomes large; therefore, it can accurately be determined whether or not the fallen object on the road is an obstacle.

As described above, each time the distance between the reference vehicle and a stationary object in front becomes smaller than a predetermined distance threshold value or one of two or more predetermined distance threshold values, there is performed weighted switching control in which switching from the horizontal-direction detection, which is an object detection method of widely detecting an object in front, to the vertical-direction detection, which is an object detection method of distinguishing whether or not an identification subject is an obstacle; therefore, it is made possible that while detection of an object in front is continued, it is accurately determined whether or not an approaching stationary object is an obstacle.

The distance threshold value may not be limited to a fixed value but be a variable value. For example, in the case of the foregoing crash damage reducing apparatus mounted in a vehicle, when the possibility of a crash between a reference vehicle and a stationary object in front is predicted before it occurs and then an alarm is given to the driver, there is utilized an alarm activation distance calculated based on the relative speed between the reference vehicle and the stationary object in front and the crash prediction time (TTC). Accordingly, as is the case with the foregoing crash damage reducing apparatus, the distance threshold value may be calculated by use of the relative speed and a predetermined crash prediction time.

The equation for calculating the foregoing distance threshold value can be given as the equation (1) below.

$$\text{distance threshold value} = \text{relative speed[m/s]} \times (\text{crash prediction time[sec]} + \alpha[\text{sec}]) \quad (1)$$

where α is a determination time required to determine whether or not a stationary object is an obstacle.

In other words, as represented in the equation (1), in accordance with the distance that is farther from the reference vehicle by (relative speed×α)[m] than the alarm activation distance at which the crash damage reducing apparatus gives an alarm, the rate of the calculation cycle in which switching to the vertical angle detection unit 7 is performed is raised, so that the obstacle determination is completed before the alarm is activated; therefore, the damage reducing apparatus can be prevented from erroneously operating. As described above, when it is determined whether or not a stationary object is an obstacle, there is set a distance threshold value corresponding to the relative speed between the reference vehicle and the stationary object, so that the switching can be performed at an appropriate timing corresponding to the traveling situation of the reference vehicle.

Embodiment 3

Figure 8:
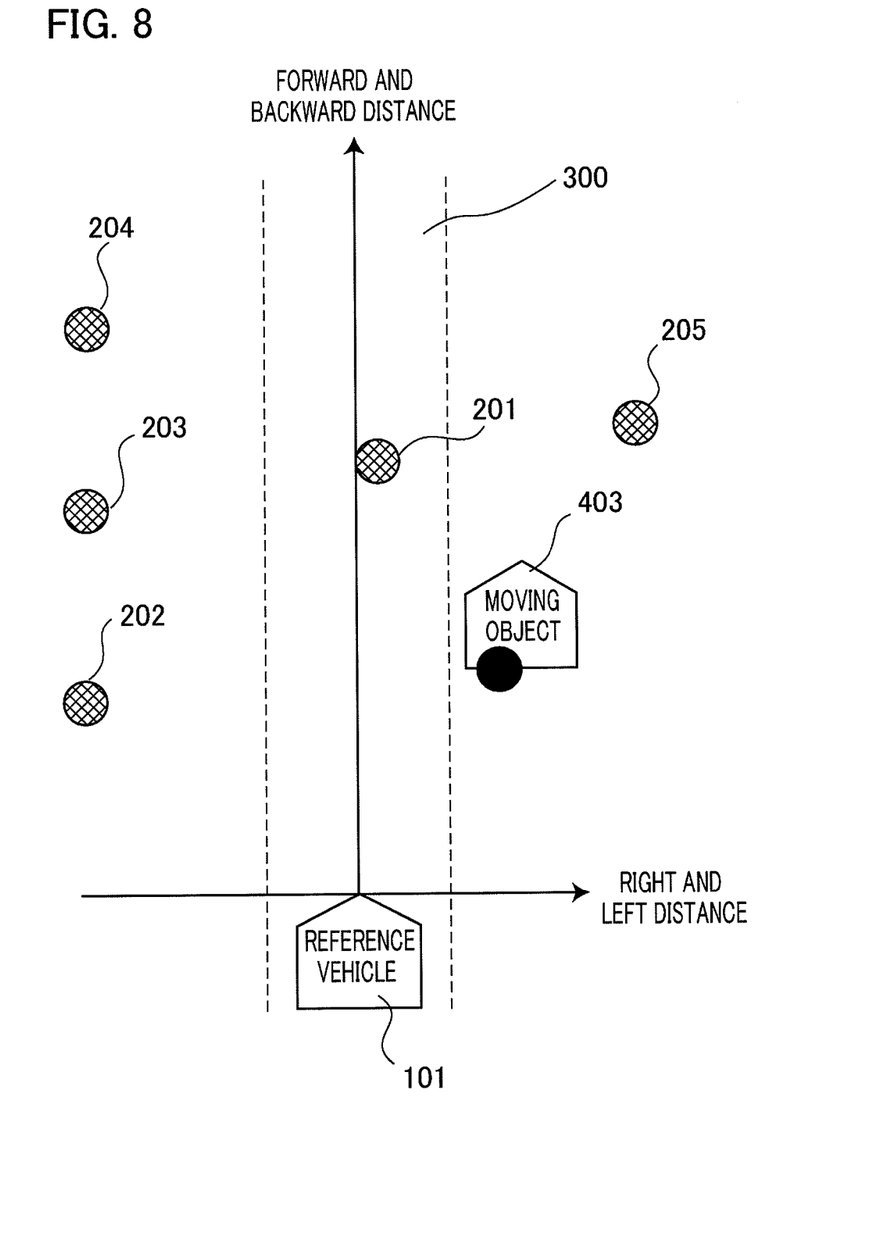
FIG. 8 is an explanatory chart representing the relative-position relationship between a reference vehicle and an object in front, in a vehicle radar system according to Embodiment 3 of the present invention.

Next, a vehicle radar system according to Embodiment 3 of the present invention will be explained. FIG. 8 is an explanatory chart representing the relative-position relationship between a reference vehicle and an object in front, in a vehicle radar system according to Embodiment 3 of the present invention; FIG. 8 is an example of bird's-eye view representing the relative-position relationship between a reference vehicle and objects in front at a time after the coordinate transformation processing in the step S23 of FIG. 2, explained above. In the case where as represented in FIG. 8, the stationary object 201 exists on the reference vehicle traveling track 300 and a moving object 403 exists at a position that is closer to the reference vehicle than the stationary object 201, another vehicle is very likely to cut in the reference vehicle's lane, regardless of whether or not the stationary object 201 is an obstacle.

As described in Embodiments 1 and 2, in the case where in order to determine whether or not a stationary object is an obstacle, switching from the horizontal-direction detection to the vertical-direction detection is performed or the rate of the vertical-direction detection is set high, detection of a cut-in vehicle, which is to be detected through the horizontal-direction detection, may be delayed or the detection itself may be missed. However, with regard to the foregoing crash damage reducing apparatus, it is more important to prevent the apparatus from becoming inoperative than to prevent the apparatus from erroneously operating.

Accordingly, in Embodiment 3 of the present invention, in the case where as represented in FIG. 8, a moving object is detected at a position that is closer to the reference vehicle than the stationary object 29 in front of the reference vehicle, switching from the horizontal-direction distance to the vertical-direction detection is prohibited. In the case where switching to the vertical-direction detection has been completed or there has been performed switching control in which the rate of the calculation cycle for the vertical angle detection unit 7 is raised, switching to the horizontal angle detection unit 8 is instantaneously performed or the switching control is stepwise performed in such a way that the rate of the calculation cycle for the horizontal-direction detection increases.

As described above, in Embodiment 3 of the present invention, in the case where another vehicle is likely to cut in the reference vehicle's lane, there is performed processing in which the horizontal-direction detection weighs much, regardless of whether or not the foregoing switching control is being performed; thus, the cut-in vehicle can accurately be detected.

Embodiment 4

Figure 9:
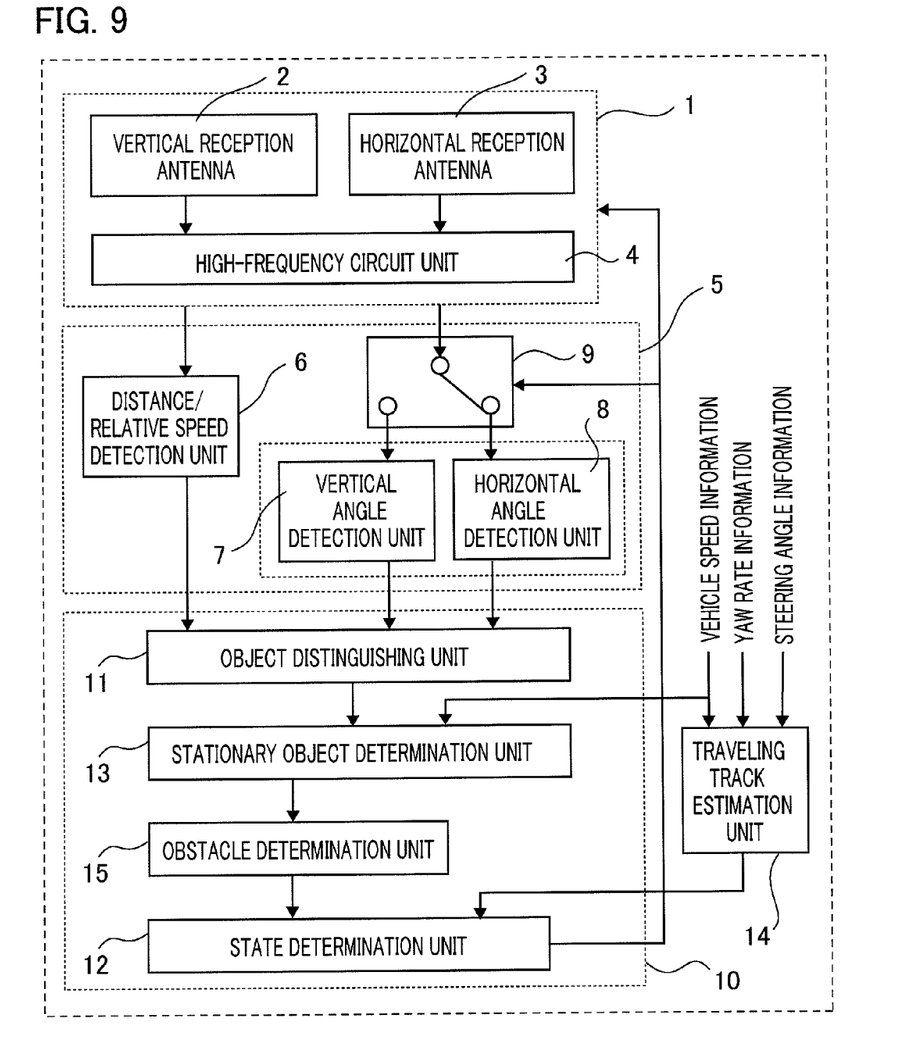
FIG. 9 is a block diagram illustrating the configuration of a vehicle radar system according to Embodiment 4 of the present invention.

Next, a vehicle radar system according to Embodiment 4 of the present invention will be explained. FIG. 9 is a block diagram illustrating the configuration of a vehicle radar system according to Embodiment 4 of the present invention. In FIG. 9, the reference numerals the same as those in FIGS. 1 and 5 denote the same or equivalent elements; thus, explanation therefor will be omitted. In FIG. 9, reference numeral 15 denotes an obstacle determination unit; the outline of obstacle determination processing thereof is the same as that explained in Embodiment 1.

Moreover, also in Embodiment 4, as explained with reference to FIGS. 6 and 7, in the process where the reference vehicle approaches a stationary object on the traveling track thereof, there is instantaneously or stepwise performed switching from the horizontal-direction detection to the vertical-direction detection, so that it is made possible that while detection of an object in front is continued, it is accurately determined whether or not an approaching stationary object is an obstacle.

When the obstacle determination unit 15 completes the determination as to whether or not an object in front is an obstacle, the state determination unit 12 performs switching control of the angle detection unit so as to instantaneously restore the horizontal angle detection unit 8 to its operation, regardless of the result of the determination. As a result, the object in front is prevented from being detected in a delayed manner or from being not detected.

Various modifications and alterations of this invention will be apparent to those skilled in the art without departing from the scope and spirit of this invention, and it should be understood that this is not limited to the illustrative embodiments set forth herein.

What is claimed is:

1. A vehicle radar system that is mounted in a vehicle, irradiates an electric wave toward a space in front of the vehicle, receives a reflected wave, which is originally the irradiated electric wave and has been reflected by an object in front of the vehicle, and detects the object, based on the received reflected wave, the vehicle radar system comprising:

a distance/relative speed detection unit that detects the distance and the relative speed between the vehicle and the object, based on the reflected wave;

a first angle detection unit that detects an incident angle of the reflected wave having a direction along which there extends a first plane parallel to a road surface on which the vehicle travels;

a second angle detection unit that detects an incident angle of the reflected wave having a direction along which there extends a second plane perpendicular to the first plane;

an object distinguishing unit that receives the values of the distance and the relative speed detected by the distance/relative speed detection unit and the value of the incident angle detected by one of the first angle detection unit and the second angle detection unit and that distinguishes the object for every predetermined calculation cycle, by use of these received values; and a state determination unit that determines a relative state between the object distinguished by the object distinguishing unit and the vehicle and that performs switching control in which based on the detection of the object by one of the first angle detection unit and the second angle detection unit, there is performed switching from the one of the first angle detection unit and the second angle detection unit to the other in the next calculation cycle, and the value of the incident angle is inputted to the object distinguishing unit, wherein in the case where a stationary object that is distinguished by the object distinguishing unit exists on a traveling track of the vehicle and a moving object exists at a position closer to the vehicle than the stationary object, the state determination unit performs the switching control in at least one of the following ways: (1) switching from the first angle detection unit to the second angle detection unit is prohibited and the value of the incident angle detected only by the first angle detection unit is inputted to the object distinguishing unit, and (2) the rate of the calculation cycle in which the value of the incident angle detected by the first angle detection unit is utilized becomes larger than the rate of the calculation vie in which the value of the incident angle detected by the second angle detection unit is utilized.

2. A vehicle radar system that is mounted in a vehicle, irradiates an electric wave toward a space in front of the vehicle, receives a reflected wave, which is originally the irradiated electric wave and has been reflected by an object in front of the vehicle, and detects the object, based on the received reflected wave, the vehicle radar system comprising:
- a distance/relative speed detection unit that detects the distance and the relative speed between the vehicle and the object, based on the reflected wave;
- a first angle detection unit that detects an incident angle of the reflected wave having a direction along which there extends a first plane parallel to a road surface on which the vehicle travels;
- a second angle detection unit that detects an incident angle of the reflected wave having a direction along which there extends a second plane perpendicular to the first plane;
- an object distinguishing unit that receives the values of the distance and the relative speed detected by the distance/relative speed detection unit and the value of the incident angle detected by one of the first angle detection unit and the second angle detection unit and that determines every predetermined calculation cycle whether or not the object is a stationary object, by use of these received values; and
- a state determination unit that performs switching control in which in accordance with the state of a relative position between the vehicle and a stationary object distinguished by the object distinguishing unit, there is performed switching from one of the first angle detection unit and the second angle detection unit to the other in the next calculation cycle, and the value of the incident angle is inputted to the object distinguishing unit, wherein in the case where a stationary object that is distinguished by the object distinguishing unit exists on a traveling track of the vehicle and the distance between the vehicle and the stationary object is smaller than a distance threshold value, the state determination unit performs the switching control in such a way that switching from the first angle detection unit to the second angle detection unit there is implemented, and the value of the incident angle is inputted to the object distinguishing unit.

3. The vehicle radar system according to claim 2, wherein the distance threshold value is a fixed distance threshold value that is preliminarily set.

4. The vehicle radar system according to claim 2, wherein the distance threshold value is a variable distance threshold value that is calculated based on a relative speed between the vehicle and a stationary object detected by the distance/relative speed detection unit.

5. A vehicle radar system that is mounted in a vehicle, irradiates an electric wave toward a space in front of the vehicle, receives a reflected wave, which is originally the irradiated electric wave and has been reflected by an object in front of the vehicle, and detects the object, based on the received reflected wave, the vehicle radar system comprising:
- a distance/relative speed detection unit that detects the distance and the relative speed between the vehicle and the object, based on the reflected wave;
- a first angle detection unit that detects an incident angle of the reflected wave having a direction along which there extends a first plane parallel to a road surface on which the vehicle travels;
- a second angle detection unit that detects an incident angle of the reflected wave having a direction along which there extends a second plane perpendicular to the first plane;
- an object distinguishing unit that receives the values of the distance and the relative speed detected by the distance/relative speed detection unit and the value of an incident angle of the reflected wave detected by one of the first angle detection unit and the second angle detection unit and that determines every predetermined calculation cycle whether or not the object is a stationary object, by use of these received values; and
- a state determination unit that performs switching control in which in accordance with the state of a relative position between the vehicle and a stationary object distinguished by the object distinguishing unit, there is performed switching from one of the first angle detection unit and the second angle detection unit to the other in the next calculation cycle, and the value of the incident angle is inputted to the object distinguishing unit, wherein in the case where a stationary object that is distinguished by the object distinguishing unit exists on a traveling track of the vehicle, the state determination unit performs the switching control in such a way that the rate of the calculation cycle in which the value of the incident angle detected by the second angle detection unit is utilized becomes larger than the rate of the calculation cycle in which the value of the incident angle detected by the first angle detection unit is utilized, each time the distance between the vehicle and the stationary object becomes smaller than any one of a plurality of distance threshold values.

6. The vehicle radar system according to claim 5, wherein the distance threshold value is a fixed distance threshold value that is preliminarily set.

7. The vehicle radar system according to claim 5, wherein the distance threshold value is a variable distance threshold value that is calculated based on a relative speed between the vehicle and a stationary object detected by the distance/relative speed detection unit.

8. A vehicle radar system that is mounted in a vehicle, irradiates an electric wave toward a space in front of the vehicle, receives a reflected wave, which is originally the irradiated electric wave and has been reflected by an object in front of the vehicle, and detects the object, based on the received reflected wave, the vehicle radar system comprising:
- a distance/relative speed detection unit that detects the distance and the relative speed between the vehicle and the object, based on the reflected wave;
- a first angle detection unit that detects an incident angle of the reflected wave having a direction along which there extends a first plane parallel to a road surface on which the vehicle travels;
- a second angle detection unit that detects an incident angle of the reflected wave having a direction along which there extends a second plane perpendicular to the first plane;
- an object distinguishing unit that receives the values of the distance and the relative speed detected by the distance/relative speed detection unit and the value of an incident angle of the reflected wave detected by one of the first angle detection unit and the second angle detection unit and that determines every predetermined calculation cycle whether or not the object is a stationary object, by use of these received values;

an obstacle determination unit that determines whether or not a stationary object distinguished by the object distinguishing unit is an obstacle to the travel of the vehicle; and a state determination unit that performs switching control in which in accordance with the state of a relative position between the vehicle and a stationary object distinguished by the object distinguishing unit, there is performed switching from one of the first angle detection unit and the second angle detection unit to the other in the next calculation cycle, and the value of the incident angle is inputted to the object distinguishing unit, wherein in the case where a stationary object that is distinguished by the object distinguishing unit exists on a traveling track of the vehicle, while the vehicle approaches the stationary object, the state determination unit performs the switching control in such a way that the switching between the first angle detection unit and the second angle detection unit is prohibited and the value of the incident angle detected only by the first angle detection unit is inputted to the object distinguishing unit, at a time point when the obstacle determination unit fixes determination, regardless of the result of the determination.

* * * * *